(12) United States Patent
Dettinger et al.

(10) Patent No.: US 7,580,949 B2
(45) Date of Patent: Aug. 25, 2009

(54) QUERY CONDITIONS ON RELATED MODEL ENTITIES

(75) Inventors: Richard D. Dettinger, Rochester, MN (US); Daniel P. Kolz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 11/106,283

(22) Filed: Apr. 14, 2005

(65) Prior Publication Data

US 2006/0235836 A1 Oct. 19, 2006

(51) Int. Cl.
G06F 17/00 (2006.01)
(52) U.S. Cl. .................................... 707/103 Y; 707/3
(58) Field of Classification Search ............... 707/3, 707/103 Y
See application file for complete search history.

(56) References Cited

U.S. PATENT DOCUMENTS

| | | | | |
|---|---|---|---|---|
| 5,047,923 | A * | 9/1991 | Elstner et al. | 707/104.1 |
| 5,713,014 | A * | 1/1998 | Durflinger et al. | 707/4 |
| 5,734,887 | A * | 3/1998 | Kingberg et al. | 707/4 |
| 6,460,043 | B1 * | 10/2002 | Tabbara et al. | 707/100 |
| 6,687,704 | B1 * | 2/2004 | Russell | 707/100 |
| 6,725,227 | B1 | 4/2004 | Li | |
| 7,185,016 | B1 * | 2/2007 | Rasmussen | 707/100 |
| 7,185,317 | B2 * | 2/2007 | Fish et al. | 717/121 |
| 7,251,653 | B2 * | 7/2007 | Huang et al. | 707/6 |
| 2002/0091681 | A1 * | 7/2002 | Cras et al. | 707/3 |
| 2003/0113727 | A1 * | 6/2003 | Girn et al. | 435/6 |
| 2003/0169284 | A1 * | 9/2003 | Dettinger et al. | 345/708 |
| 2004/0039736 | A1 * | 2/2004 | Kilmer et al. | 707/3 |
| 2004/0193579 | A1 * | 9/2004 | Dettinger et al. | 707/3 |
| 2006/0212418 | A1 * | 9/2006 | Dettinger et al. | 707/1 |

OTHER PUBLICATIONS

U.S. Appl. No. 10/083,075, "Application Portability and Extensibility Through Database Schema and Query Abstraction", filed Feb. 26, 2002.
U.S. Appl. No. 11/005,418, "Abstract Query Plan", filed Dec. 6, 2004.
U.S. Appl. No. 10/403,356, "Dealing with Composite Data Through Data Model Entities", filed Mar. 31, 2003.

* cited by examiner

*Primary Examiner*—Don Wong
*Assistant Examiner*—Thanh-Ha Dang
(74) *Attorney, Agent, or Firm*—Patterson & Sheridan, LLP

(57) ABSTRACT

Embodiments of the invention provide methods, systems and articles of manufacture for constructing a database abstraction model over an underlying physical database. Typically, queries of the database abstraction model are directed to queries of a model entity defined for the database abstraction model. To compose an abstract query, users select conditions evaluated using data associated with instances of the model entity. Using the database abstraction model, users may compose an abstract query according to logical or intuitive relationships among data elements stored in the underlying database. One addition to the database abstraction model is the ability to apply query criteria against related instances of a model entity. Because model entities may share a predefined relationship, embodiments of the invention allow for users to specify query criteria applied against related instances. Related instances may be identified by invoking a path function provided by the database abstraction model. A path function may be configured to return instances of the model entity that are related to an instance input to the path function.

6 Claims, 13 Drawing Sheets

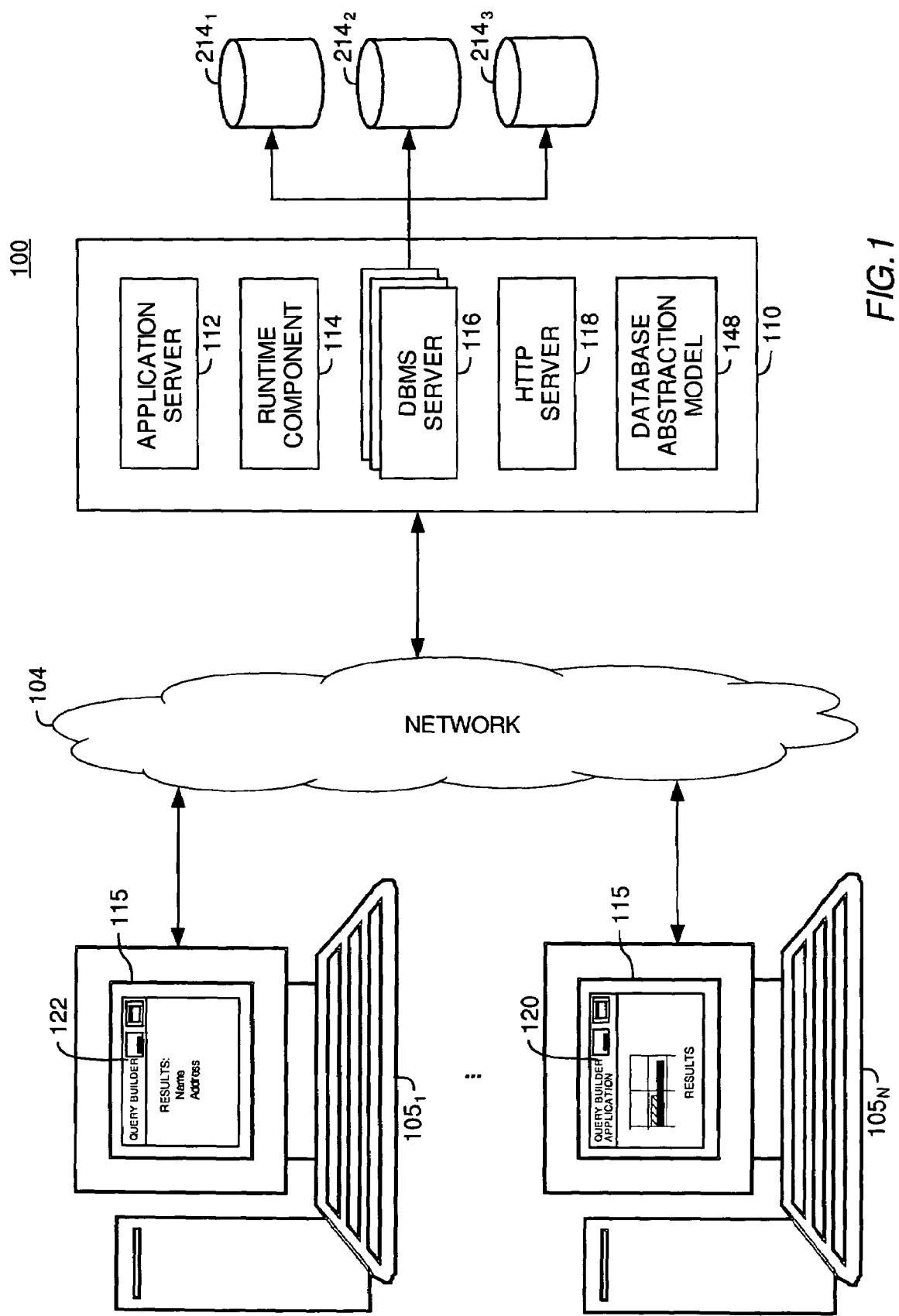

DATABASE ABSTRACTION MODEL — 148

LOGICAL FIELDS — 208

MODEL ENTITIES

225 — Name = Patient
  Instance
  Table = Demographics
  Column = Patient ID

226 — Relationships
  Demographics.Patient ID ➤
      Lineage. Patient ID
  Demographics.Patient ID ➤
      Tests. Patient ID 227 — Related Model Entity Paths
  Name = Parents
    Path Function
    "Select Father from Lineage
    Where Patient ID = ?
    Union Select Mother from Lineage
    Where Patient ID = ?"
  Name = Children
    Path Function
    "Select Patient ID from Lineage
    Where Father = ? Mother = ?"
  Name = Siblings
    Path Function
    "Select t2.PID from Lineage t1
    Inner Join Lineage t2 on
    t1.Father = t2.Father or
    t1.Mother = t2.Mother
    Where t1.PID = ?"

228 — Path Categories :
  Model Entities
    Children, Parents, Siblings
  Allowed Logical Fields
    First Name, Last Name,
    Hemoglobin_Test, Age,
    Cancer Diagnosis

LINEAGE TABLE — 430

| PID | FATHER | MOTHER |
|---|---|---|
| 1 | 4 | 5 |
| 2 | 6 | 7 |
| 3 | 1 | 2 |
| 4 | NULL | NULL |
| 5 | NULL | NULL |
| 6 | NULL | NULL |
| 7 | NULL | NULL |
| 8 | 4 | 5 |

DEMOGRAPHICS TABLE — 440

| PID | F-NAME | BIRTHDATE |
|---|---|---|
| 1 | KARL | 3/15/50 |
| 2 | KRIS | 7/30/55 |
| 3 | RENEE | 1/13/80 |
| 4 | PAUL | 6/7/13 |
| 5 | ESTHER | 10/31/12 |
| 6 | LOWELL | 12/31/21 |
| 7 | ANGELINE | 8/8/25 |
| 8 | BRYON | 5/24/39 |

TESTS — 410

| PID | TYPE | VALUE |
|---|---|---|
| 3 | 124.3 | 23 |
| 5 | 12.6 | 25 |
| 8 | 834 | 4 |
| 2 | 56 | 32 |

DIAGNOSIS TABLE — 420

| PID | CODE | DATE | DIAGNOSIS NAME |
|---|---|---|---|
| 2 | 123.2 | 6/2/96 | CANCER |
| 7 | 34.6 | 7/8/70 | HIGH BLOOD PRESSURE |

*FIG. 4*

○ QUERY BUILDING INTERFACE — 115

FILE    EDIT

DATABASE ABSTRACTION MODEL | QUERY SUMMARY — 510

⊞ PATIENT DEMOGRAPHICS | FIND PATIENTS WITH AGE LESS THAN 30
☐ TESTS | RELATED MODEL ENTITY QUERY:
— HEMOGLOBIN | PARENTS WITH DIAGNOSIS EQUAL TO CANCER
— BLOOD PRESSURE
...

| CONDITIONS | OUTPUT |

ADD SELECTION CRITERIA

MODIFY     LOGICAL FIELD    OPERATOR    VALUE
  ☐           AGE              <          30
  ☒         SELECT FIELD ▼    = ▼
  ☐ ← 540  RELATED MODEL ENTITY QUERY

QUERY ON RELATED
                          MODEL ENTITIES
                               538
MODIFY SELECTED    EXECUTE    ADD CONDITION    CLEAR
    542             546           541           544

○ QUERY BUILDING INTERFACE ⟵ 115

FILE    EDIT

DATABASE ABSTRACTION MODEL ⟵ 510
⊞ PATIENT DEMOGRAPHICS
⊟ TESTS
— HEMOGLOBIN
— BLOOD PRESSURE
...

QUERY SUMMARY

FIND PATIENTS WITH AGE LESS THAN 30
RELATED MODEL ENTITY QUERY :
PARENTS WITH DIAGNOSIS EQUAL TO CANCER

| CONDITIONS | OUTPUT |
| 312 | 314 |

⟵ 580

SELECT LOGICAL FIELDS TO INCLUDE IN QUERY RESULTS

[PATIENT ID]   (REMOVE)

[FIRST NAME]   (REMOVE)

[AGE]          (REMOVE)

[EXECUTE]   [ADD LOGICAL FIELD]   [CLEAR]
  546            581                544

QUERY CONDITIONS ON RELATED MODEL ENTITIES

CROSS-REFERENCE TO RELATED APPLICATIONS

This application is related to a commonly assigned, co-pending, U.S. patent application Ser. No. 10/083,075, filed Feb. 26, 2002, entitled "Application Portability and Extensibility through Database Schema and Query Abstraction," incorporated herein by reference in its entirety. This application is also related to commonly assigned, co-pending U.S. patent application Ser. No. 10/403,356, filed Mar. 31, 2003, entitled "Dealing with Composite Data through Data Model Entities," incorporated herein by reference in its entirety. This application is also related to commonly assigned, co-pending application entitled "Abstract Query Plan," Ser. No. 11/005,418, filed Dec. 6, 2004, which is incorporated by reference herein in its entirety.

BACKGROUND OF THE INVENTION

1. Field of the Invention

The invention generally relates to computer database systems. More particularly, the invention relates to a database abstraction model constructed over an underlying physical database, and to a database query application used to generate queries of the underlying physical database from a query of the database abstraction model.

2. Description of the Related Art

Databases are well known systems for storing, searching, and retrieving information stored in a computer. The most prevalent type of database used today is the relational database, which stores data using a set of tables that may be reorganized and accessed in a number of different ways. Users access information in relational databases using a relational database management system (DBMS).

Each table in a relational database includes a set of one or more columns. Each column typically specifies a name and a data type (e.g., integer, float, string, etc), and may be used to store a common element of data. For example, in a table storing data about patients treated at a hospital, each patient might be referenced using a patient identification number stored in a "patient ID" column. Reading across the rows of such a table would provide data about a particular patient. Tables that share at least one attribute in common are said to be "related." Further, tables without a common attribute may be related through other tables that do share common attributes. A path between two tables is often referred to as a "join," and columns from tables related through a join may be combined to from a new table returned as a set of query results.

Queries of a relational database may specify columns to retrieve data from, how to join the columns together, and conditions (predicates) that must be satisfied for a particular data item to be included in a query result table. Current relational databases require that queries be composed in complex query languages. Today, the most widely used query language is Structured Query Language (SQL). However, other query languages are also used. An SQL query is composed from one or more clauses set off by a keyword. Well-known SQL keywords include SELECT, WHERE, FROM, HAVING, ORDER BY, and GROUP BY. Composing a proper SQL query requires that a user understand both the structure and content of the relational database as well as the complex syntax of the SQL query language (or other query language). The complexity of constructing an SQL statement, however, generally makes it difficult for average users to compose queries of a relational database.

Because of this complexity, users often turn to database query applications to assist them in composing queries of a database. One technique for managing the complexity of a relational database, and the SQL query language, is to use database abstraction techniques. Commonly assigned U.S. patent application Ser. No. 10/083,075 (the '075 application) entitled "Application Portability and Extensibility through Database Schema and Query Abstraction," discloses techniques for constructing a database abstraction model over an underlying physical database.

The '075 application discloses embodiments of a database abstraction model constructed using logical fields that map to data stored in the underlying physical database. Each logical field defines an access method that specifies a location (i.e., a table and column) in the underlying database from which to retrieve data. Users compose an abstract query by selecting logical fields and specifying conditions. The operators available for composing conditions in an abstract query generally include the same operators available in SQL (e.g., comparison operators such as =, >, <, >=, and, <=, and logical operators such as AND, OR, and NOT). Data is retrieved from the physical database by generating a resolved query (e.g., an SQL statement) from the abstract query. Because the database abstraction model is tied to neither the syntax nor the semantics of the physical database, additional capabilities may be provided by the database abstraction model without having to modify the underlying database. Thus, the database abstraction model provides a platform for additional enhancements that allow users to compose meaningful queries easily, without having to disturb existing database installations.

For example, researchers often wish to select patients that have a specific family history. This is often the case in preventative studies. For example, a researcher may wish to identify individuals to participate in a test for a drug that seeks to prevent the first instance of a heart attack (or other disease or condition) based on family history. One reasonable way to test this effectively, while also using a small sample of individuals, is to use individuals that have a very high likelihood of experiencing a heart attack. Although medical institutions keep extensive data about relationships between patients, it may be difficult to compose a query that identifies patients with a specific family history. That is, composing a query that retrieves data about a first patient based on conditions applied only to related patients requires a sophisticated SQL query. More generally, it is difficult to compose an SQL query to identify instances of an entity (e.g., a patient) based on conditions evaluated against related entities (e.g., a patient's parents). At a minimum, doing so requires that a user (i) query to identify instances of the entity; (ii) query to find related instances of the entity; (iii) select related instances satisfy the desired conditions; and (iv) join these results to the original instances of the entity. Accordingly, it would be useful to enhance the database abstraction model to allow users to compose queries that specify conditions evaluated against related entities.

SUMMARY OF THE INVENTION

The present invention generally provides methods systems and articles of manufacture that provide a database query application that allows users to include query conditions evaluated against related model entities as part of an abstract query. One embodiment of the invention provides a method for processing an abstract query. The method generally includes providing a database abstraction model that describes data stored in a physical database the database abstraction model comprising (i) a plurality of logical fields each specifying an access method for accessing data in the physical database, (ii) a model entity specifying an identifier in the physical database used to distinguish instances of the model entity, wherein a first instance of the model entity is related to a second instance of the model entity, according to a predefined relationship. The method generally further includes receiving an abstract query composed using logical fields selected from the plurality of logical fields, wherein the abstract query specifies at least one condition to be evaluated using data associated with the first instance of the model entity to determine whether to include the second instance of the model entity in a query result returned for the abstract query, and transforming the abstract query into a query consistent with a particular physical data representation of the physical database. The method generally still further includes issuing the transformed query to the underlying physical database, and returning, to the requesting entity, the set of query results received in response to issuing the transformed query.

Another embodiment of the invention provides a computer-readable medium, containing a program which, when executed on a processor performs operations for processing an abstract query. The operations generally include providing a database abstraction model that describes data stored in a physical database the database abstraction model comprising (i) a plurality of logical fields each specifying an access method for accessing data in the physical database, (ii) a model entity specifying an identifier in the physical database used to distinguish instances of the model entity, wherein a first instance of the model entity is related to a second instance of the model entity, according to a predefined relationship. The operations generally further include receiving an abstract query composed using logical fields selected from the plurality of logical fields, wherein the abstract query specifies at least one condition to be evaluated using data associated with the first instance of the model entity to determine whether to include the second instance of the model entity in a query result returned for the abstract query, and transforming the abstract query into a query consistent with a particular physical data representation of the physical database. The operations generally further include issuing the transformed query to the underlying physical database, and returning, to the requesting entity, the set of query results received in response to issuing the transformed query.

Another embodiment of the invention provides a computer-readable medium, containing a program which, when executed on a processor performs operations for providing access to data in a physical database. The operations generally include providing a database abstraction model that describes data stored in a physical database the database abstraction model comprising (i) a plurality of logical fields each specifying an access method for accessing data in the physical database, (ii) a model entity specifying an identifier in the physical database used to distinguish instances of the model entity, wherein a first instance of the model entity is related to a second instance of the model entity, according to a predefined relationship. The operations generally further include providing a runtime component configured to receive an abstract query composed using logical fields selected from the plurality of logical fields, wherein the abstract query specifies at least one condition to be evaluated using data associated with the first instance of the model entity to determine whether to include the second instance of the model entity in a query result returned for the abstract query, and further configured to transform the abstract query into a query consistent with a particular physical data representation of the physical database. The operations also generally include providing a query building interface for composing an abstract query from the plurality of logical fields, wherein the interface is configured to allow a user to compose the abstract query that includes the at least one condition.

Another embodiment of the invention provides a system. The system generally includes a physical database and a database abstraction model that describes data stored in the physical database, the database abstraction model comprising (i) a plurality of logical fields each specifying an access method for accessing data in the physical database, (ii) a model entity specifying an identifier in the physical database used to distinguish instances of the model entity, wherein a first instance of the model entity is related to a second instance of the model entity, according to a predefined relationship. The system generally further includes a runtime component configured to receive an abstract query composed using logical fields selected from the plurality of logical fields, wherein the abstract query specifies at least one condition to be evaluated using data associated with the first instance of the model entity to determine whether to include the second instance of the model entity in a query result returned for the abstract query, and further configured to transform the abstract query into a query consistent with a particular physical data representation of the physical database. The system generally further includes a query building interface for composing an abstract query from the plurality of logical fields, wherein the interface is configured to allow a user to compose the abstract query that includes the at least one condition.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments illustrated by the appended drawings. These drawings, however, illustrate only typical embodiments of the invention and are not limiting of its scope, for the invention may admit to other equally effective embodiments.

FIG. 1 illustrates a set of exemplary computer systems connected to a data communications network, according to one embodiment of the invention.

FIG. 2C further illustrates an exemplary database abstraction model, according to one embodiment of the invention.

FIG. 4 illustrates an exemplary a relational database, according to one embodiment of the invention.

FIGS. 5A-5E illustrate exemplary graphical user interface screens for composing an abstract query, according to one embodiment of the invention.

DETAILED DESCRIPTION OF THE PREFERRED EMBODIMENTS

Figure 2A:
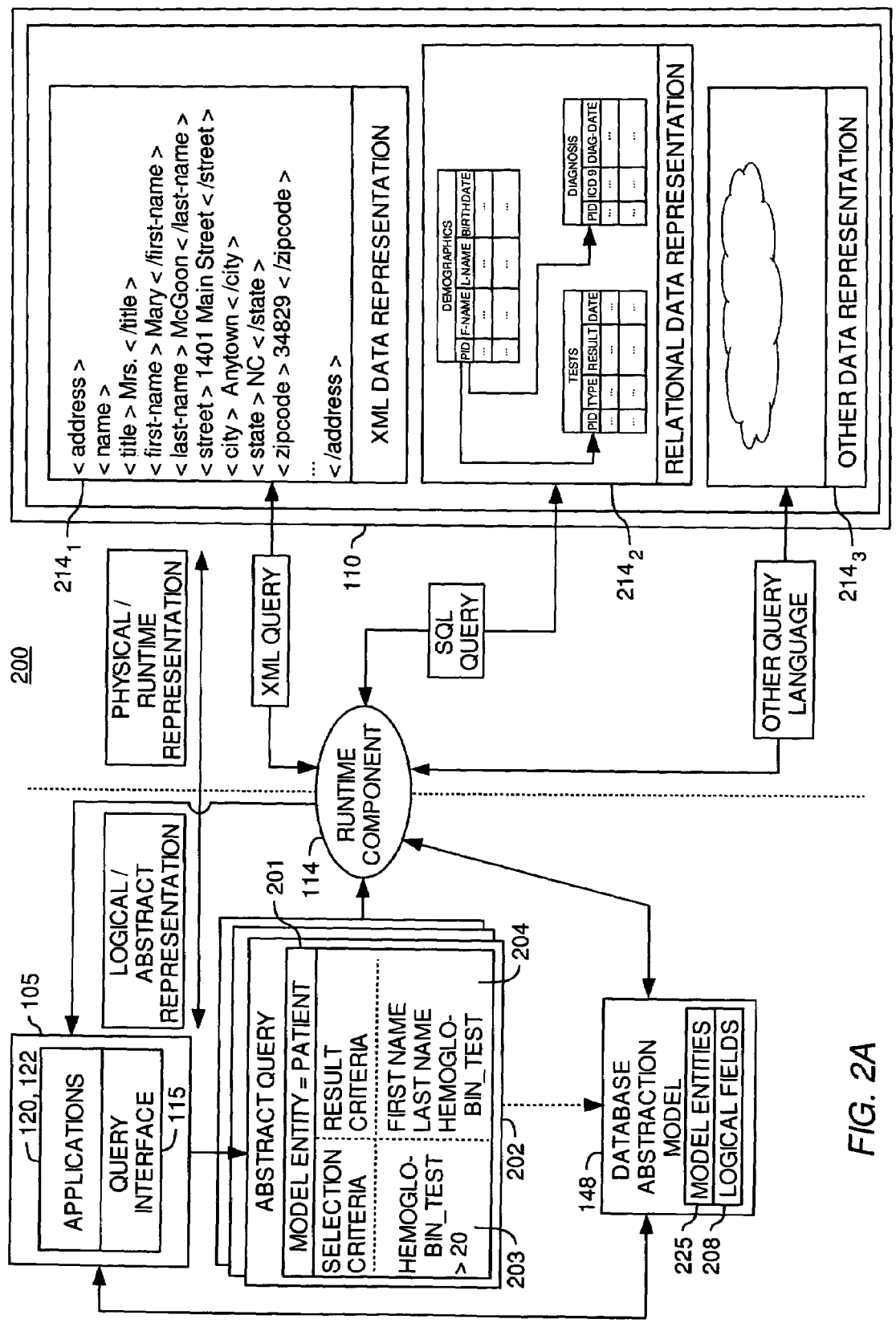
FIG. 2A illustrates a logical view of a database abstraction model and a view of an underlying physical database, according to one embodiment of the invention.

Embodiments of the invention provide techniques for composing queries of a database abstraction model to identify instances of an entity using selection criteria applied against related instances of the entity. For example, embodiments of the present invention may be used by a user composing a query of the database abstraction model to identify patients whose parents have a previous diagnosis of cancer.

In one embodiment, queries of the database abstraction model are directed to queries of a model entity. Each model entity defines the focus, or central concept, for an abstract query. Rather than composing a query of the underlying database, users compose a query to identify instances of the model entity (e.g., a patient, employee, or test). Conditions included in the abstract query are used to specify which instances of the model entity the user desires to identify.

As described in greater detail below, each instance of a model entity (e.g., a specific patient, employee or test) may be defined using data from the underlying physical database, such as the primary key of a relational table. For example, a model entity may be defined in reference to the "patient ID" (or "PID" for short) value used as a primary key. Embodiments of the invention allow users to compose an abstract query that includes conditions evaluated against related instances of a current model entity. This is done by providing paths from a current model entity (e.g. patients) to related model entities (e.g., parents, siblings, etc). In one embodiment, each path may include a name and a path function. The name is a description of the instances of the model entity returned by the path function. For example, for a "patient" model entity, path names might include parent, sibling, and child. Each path function takes the identifier (or identifiers) for an instance of a model entity and returns instances related to the input one. When composing an abstract query a user may specify which conditions should be evaluated against the related instances of a model entity identified using the path function.

The following description references embodiments of the invention. The invention, however, is not limited to any specifically described embodiment; rather, any combination of the following features and elements, whether related to a described embodiment or not, implements and practices the invention. Moreover, in various embodiments the invention provides numerous advantages over the prior art. Although embodiments of the invention may achieve advantages over other possible solutions and the prior art, whether a particular advantage is achieved by a given embodiment does not limit the scope of the invention. Thus, the following aspects, features, embodiments and advantages are illustrative of the invention and are not considered elements or limitations of the appended claims; except where explicitly recited in a claim. Similarly, references to "the invention" should neither be construed as a generalization of any inventive subject matter disclosed herein nor considered an element or limitation of the appended claims; except where explicitly recited in a claim.

One embodiment of the invention is implemented as a program product for use with a computer system such as, for example, the computer system 100 shown in FIG. 1 and described below. The program product defines functions of the embodiments (including the methods) described herein and can be contained on a variety of signal-bearing media. Illustrative signal-bearing media include, without limitation, (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed across communications media, (e.g., a computer or telephone network) including wireless communications. The latter embodiment specifically includes information shared over the Internet or other computer networks. Such signal-bearing media, when carrying computer-readable instructions that perform methods of the invention, represent embodiments of the present invention.

In general, software routines implementing embodiments of the invention may be part of an operating system or part of a specific application, component, program, module, object, or sequence of instructions such as an executable script. Such software routines typically comprise a plurality of instructions capable of being performed using a computer system. Also, programs typically include variables and data structures that reside in memory or on storage devices as part of their operation. In addition, various programs described herein may be identified based upon the application for which they are implemented. Those skilled in the art recognize, however, that any particular nomenclature or specific application that follows facilitates a description of the invention and does not limit the invention for use solely with a specific application or nomenclature. Furthermore, the functionality of programs are described herein using discrete modules or components interacting with one another. Those skilled in the art recognize, however, that different embodiments may combine or merge such components and modules in many different ways.

Moreover, examples described herein reference medical research environments. These examples are provided to illustrate embodiments of the invention, as applied to one type of data environment. The techniques of the invention, however, are contemplated for any data environment including, for example, transactional environments, financial environments, research environments, accounting environments, legal environments, and the like.

The Database Abstraction Model: Physical View of the Environment

FIG. 1 illustrates a networked computer system using a client-server configuration. Client computer systems $105_{1-N}$ include an interface that enables network communications with other systems over network 104. The network 104 may be a local area network where both the client system 105 and server system 110 reside in the same general location, or may be network connections between geographically distributed systems, including network connections over the Internet. Client system 105 generally includes a central processing unit (CPU) connected by a bus to memory and storage (not shown). Each client system 105 is typically running an operating system configured to manage interaction between the computer hardware and the higher-level software applications running on client system 105, (e.g., a Linux® distribution, Microsoft Windows®, IBM's AIX® or OS/400®, FreeBSD, and the like). (Note, "Linux" is a registered trademark of Linus Torvalds in the United States and other countries.)

The server system 110 may include hardware components similar to those used by client system 105. Accordingly, the server system 110 generally includes a CPU, a memory, and a storage device, coupled by a bus (not shown). The server system 110 is also running an operating system, (e.g., a Linux® distribution, Microsoft Windows®, IBM's OS/400® or AIX®, FreeBSD, and the like).

The client-server configuration illustrated in FIG. 1, however, is merely exemplary of one hardware and software configuration. Embodiments of the present invention may be implemented using other configurations, regardless of whether the computer systems are complex multi-user computing systems, such as a cluster of individual computers connected by a high-speed network, single-user workstations, or network appliances lacking non-volatile storage. Additionally, although FIG. 1 illustrates computer systems using a client-server architecture, embodiments of the invention may be implemented in a single computer system, or in other configurations, including peer-to-peer, distributed, or grid architectures.

In one embodiment, users interact with the server system 110 using a graphical user interface (GUI) provided by query building interface 115. In a particular embodiment, GUI content may comprise HTML documents (i.e., web-pages) rendered on a client computer system $105_1$ using web-browser 122. In such an embodiment, the server system 110 includes a Hypertext Transfer Protocol (HTTP) server 118 (e.g., a web server such as the open source Apache web-sever program or IBM's Web Sphere® program) configured to respond to HTTP requests from the client system 105 and to transmit HTML documents to client system 105. The web-pages themselves may be static documents stored on server system 110 or generated dynamically using application server 112 interacting with web-server 118 to service HTTP requests. Alternatively, client application 120 may comprise a database front-end, or query application program running on client system $105_N$. The web-browser 122 and the application 120 may be configured to allow a user to compose an abstract query, and to submit the query to the runtime component 114.

As illustrated in FIG. 1, server system 110 may further include runtime component 114, DBMS server 116, and database abstraction model 148. In one embodiment, these components may be provided using software applications executing on the server system 110. The DBMS server 116 includes a software application configured to manage databases $214_{1-3}$. That is, the DBMS server 116 communicates with the underlying physical database system, and manages the physical database environment behind the database abstraction model 148. Users interact with the query interface 115 to compose and submit an abstract query to the runtime component 114 for processing. In turn, the runtime component 114 receives an abstract query and, in response, generates a query of underlying physical databases 214.

In one embodiment, the runtime component may be configured to generate a physical query (e.g., an SQL statement) from an abstract query. Typically, users compose an abstract query from the logical fields defined by the database abstraction model 148. And the runtime component 114 may be configured to use the access method defined for a logical field 208 when generating a query of the underlying physical database (referred to as a "resolved" or "physical" query) from an abstract query. Logical fields and access methods are described in greater detail below in reference to FIGS. 2A-2C. Additionally, the runtime component 114 may also be configured to return query results to the requesting entity, (e.g., using HTTP server 118, or equivalent).

The Database Abstraction Model: Logical View of the Environment

FIG. 2A illustrates a plurality of interrelated components of the invention, and also illustrates the relationship between the logical view of data provided by the database abstraction model components (the left side of FIG. 2A), and the underlying physical database components (the right side of FIG. 2A).

In one embodiment, the database abstraction model 148 provides definitions for a set of logical fields 208 and model entities 225. Users compose an abstract query 202 by specifying logical fields 208 to include in selection criteria 203 and results criteria 204. An abstract query 202 may also identify a model entity 201 from the set of model entities 225. The resulting query is generally referred to herein as an "abstract query" because it is composed using logical fields 208 rather than direct references to data structures in the underlying physical databases 214. The model entity 225 may be used to indicate the focus of the abstract query 202 (e.g., a "patient", a "person", an "employee", a "test", a "facility" etc).

For example, abstract query 202 includes an indication of that the query is directed to instances of the "patient" model entity 201, and further includes selection criteria 203 indicating that patients with a "hemoglobin_test>20" should be retrieved. The selection criteria 203 are composed by specifying a condition evaluated against the data values corresponding to a logical field 208 (in this case the "hemoglobin_test" logical field). The operators in a condition typically include comparison operators such as =, >, <, >=, or, <=, and logical operators such as AND, OR, and NOT. Results criteria 204 indicates that data retrieved for this abstract query 202 includes data for the "name," "age," and "hemoglobin_test" logical fields 208.

In one embodiment, users compose an abstract query 202 using query building interface 115. The definition for each logical field 208 in the database abstraction model 148 specifies an access method identifying the location of data in the underlying physical database 214. In other words, the access method defined for a logical field provides a mapping between the logical view of data exposed to a user interacting with the interface 115 and the physical view of data used by the runtime component 114 to retrieve data from the physical databases 214.

Additionally, the database abstraction model 148 may define a set of model entities 225 that may be used as the focus, or central concept, for an abstract query 202. In one embodiment, users select which model entity to query as part of the query composition process. Model entities are descried below, and further described in commonly assigned, co-pending application Ser. No. 10/403,356, filed Mar. 31, 2003, entitled "Dealing with Composite Data through Data Model Entities," incorporated herein by reference in its entirety.

In one embodiment, the runtime component 114 retrieves data from the physical database 214 by generating a resolved query (e.g., an SQL statement) from the abstract query 202. Because the database abstraction model 148 is not tied to either the schema of the physical database 214 or the syntax of a particular query language, additional capabilities may be provided by the database abstraction model 148 without having to modify the underlying database. Further, depending on the access method specified for a logical field, the runtime component 114 may transform abstract query 202 into an XML query that queries data from database $214_1$, an SQL query of relational database $214_2$, or other query composed according to another physical storage mechanism using other data representation $214_3$, or combinations thereof (whether currently known or later developed).

An illustrative abstract query, corresponding to abstract query 202, is shown in Table I below. In this example, the abstract query 202 is represented using eXtensible Markup Language (XML). In one embodiment, query building interface 115 may be configured to generate an XML document to represent an abstract query composed by a user. Those skilled in the art will recognize that XML is a well known markup language used to facilitate the sharing of structured text and information. Other markup languages, however, may be used.

TABLE I

Query Example

```
001    <?xml version="1.0"?>
002    <!--Query string representation: ("Hemoglobin_test > 20")
003    <QueryAbstraction>
004        <Selection>
005            <Condition>
006                <Condition field="Hemoglobin Test"
                       operator="GT" value="27.5"
007            </Condition>
008        </Selection>
009        <Results>
010                <Field name="Name"/>
011                <Field name="Age"/>
012                <Field name="hemoglobin_teset"/>
013        </Results>
014        <Entity name="patient" >
015                <FieldRef name="data://patient/PatientID" />
016                    <Usage type="query" />
017                </EntityField>
018        </Entity>
019    </QueryAbstraction>
```

The XML markup shown in Table I includes the selection criteria 203 (line 004-008) and the results criteria 204 (lines 009-013). Selection criteria 203 includes a field name (for a logical field), a comparison operator (=, >, <, etc) and a value expression (what the field is being compared to). In one embodiment, the results criteria 204 includes a set of logical fields for which data should be returned. The actual data returned is consistent with the selection criteria 203. Line 14 identifies the model entity selected by a user, in this example, a "patient" model entity 201. Line 15 indicates the identifier in the physical database 214 used to identify instances of the model entity. In this case, instances of the "patient" model entity are identified using values from the "Patient ID" column of a patient table.

Figure 2B:
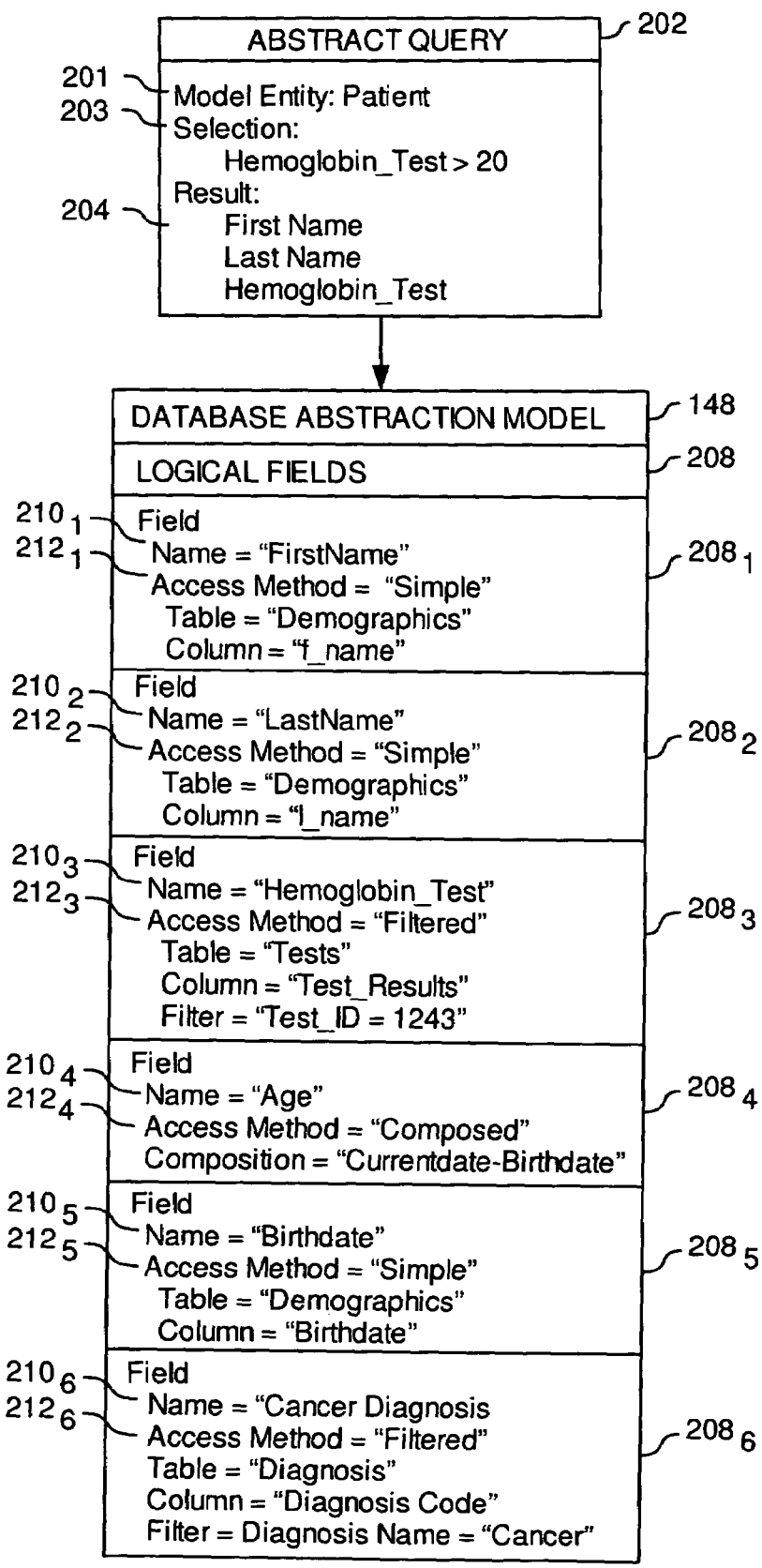
FIG. 2B illustrates an exemplary abstract query and database abstraction model, according to one embodiment of the invention.

FIG. 2B further illustrates an exemplary abstract query 202 and database abstraction model 148. Illustratively, abstract query 202 includes selection criteria 203 indicating that the query should retrieve instances of the "patient" model entity 201 with a "hemoglobin" test value greater than "20." The particular information retrieved using abstract query 202 is specified by result criteria 204. In this example, the abstract query 202 retrieves a patient's name and a test result value for a hemoglobin test. The actual data retrieved may include data from multiple tests. That is, the query results may exhibit a one-to-many relationship between an instance of a model entity and a set of query results.

After composing an abstract query, a user may provide it to runtime component 114 for processing. In one embodiment, the runtime component 114 may be configured to process the abstract query 202 by generating an intermediate representation, such as an abstract query plan. In one embodiment, an abstract query plan is composed from a combination of abstract elements from the data abstraction model and physical elements relating to the underlying physical database. For example, an abstract query plan may identify which relational tables and columns are referenced by which logical fields included in the abstract query, and further identify how to join columns of data together. The runtime component may then parse the intermediate representation in order to generate a physical query of the underlying physical database (e.g., an SQL statement (or statements) executed against database $214_2$)). Abstract query plans and query processing are further described in a commonly assigned, co-pending application entitled "Abstract Query Plan," Ser. No. 11/005,418, filed Dec. 6, 2004, which is incorporated by reference herein in its entirety.

The Database Abstraction Model: Logical Fields

FIG. 2B also illustrates an embodiment of a database abstraction model 148 that includes a plurality of logical field specifications $208_{1-6}$ (six shown by way of example). The access methods included in the logical field specifications 208 (or logical field, for short) map the logical fields 208 to tables and columns in an underlying relational database (e.g., database $214_2$ shown in FIG. 2A). As illustrated, each field specification 208 identifies a logical field name $210_{1-6}$ and an associated access method $212_{1-6}$. Depending upon the different types of logical fields, any number of access methods may be supported by the database abstraction model 148. FIG. 2B illustrates access methods for simple fields, filtered fields, and composed fields. Each of these three access methods are described below.

A simple access method specifies a direct mapping to a particular entity in the underlying physical database. Field specifications $208_1$, $208_2$, and $208_5$ each provide a simple access method, $212_1$, $212_2$, and $212_5$, respectively. For a relational database, the simple access method maps a logical field to a specific database table and column. For example, the simple field access method $212_1$ shown in FIG. 2B maps the logical field name $210_1$ "FirstName" to a column named "f_name" in a table named "Demographics."

Logical field specifications $208_3$ and $208_6$ exemplify fields with a filtered field access method. Filtered access methods identify an associated physical database and provide rules that define a particular subset of items within the underlying database that should be returned for the filtered field or used for comparison purposes. Consider, for example, a relational table storing test results for a plurality of different medical tests. Logical fields corresponding to each different test may be defined, and a filter for each different test is used to associate a specific test with a logical field. For example, logical field $208_3$ illustrates a hypothetical "hemoglobin test." The access method for this filtered field $212_3$ maps to the "Test_Result" column of a "Tests" tests table and defines a filter "Test_ID='1243.'" Only data from rows of a table that satisfies the filter are returned for this logical field, or used to evaluate a query condition. Accordingly, the filtered field $208_3$ returns a subset of data from a larger set, without the user having to know the specifics of how the data is represented in the underlying physical database, or having to specify the selection criteria as part of the query building process. Similarly, logical field $208_6$ includes a filter for returning from rows of a diagnosis table where the diagnosis code corresponds to a diagnosis of cancer.

Field specification $208_4$ exemplifies a composed access method $212_4$. Composed access methods generate a return value by retrieving data from the underlying physical database and performing operations on the data. In this way, information that does not directly exist in the underlying data representation may be determined and provided to a user. For example, logical field access method $212_4$ illustrates a composed access method that maps the logical field "age" $208_4$ to another logical field $208_5$ named "birthdate." In turn, the logical field "birthdate" $208_5$ maps to a column in a demographics table of relational database $214_2$. In this example, data for the "age" logical field $208_4$ is computed by retrieving data from the underlying database using the "birthdate" logical field $208_5$, and subtracting a current date value from the birth date value to calculate an age value returned for the logical field $208_4$.

By way of example, the field specifications 208 of the data repository abstraction component 148 shown in FIG. 2B are representative of logical fields mapped to data represented in the relational data representation $214_2$. However, other instances of the data repository abstraction component 148 or other logical field specifications may map to other physical data representations (e.g., databases $214_1$ or $214_3$ illustrated in FIG. 2A). Further, in one embodiment, the database abstraction model 148 is stored on computer system 110 using an XML document that describes the model entities, logical fields, access methods, and additional metadata that, collectively, define the database abstraction model 148 for a particular physical database system. Other storage mechanisms or markup languages, however, are also contemplated.

The Database Abstraction Model: Model Entities

FIG. 2C further illustrates the exemplary database abstraction model 148. In addition to logical fields 208, the database abstraction model 148 may include model entity definitions 225. FIG. 2C illustrates a definition for the "patient" model entity first illustrated in FIGS. 2A and 2B. In one embodiment, the conditions included in an abstract query are evaluated against instances of the model entity in the underlying database. As illustrated, model entity definition 225 includes a model entity name, model entity relationships, paths to related model entities, and path categories.

Illustratively, the "patient" model entity 225 is defined with a name (for the model entity, i.e. "patient") and an instance identifier used to distinguish between instances of the patient model entity. Instances of the "patient" model entity are identified using values from the "patient ID" column of a demographic table in the physical database 214. Model entity relationships section 226 identifies the relationships between an instance of the "patient" model entity and data stored in other tables in the physical database 214. For example, the first model entity relationship indicates that data from a row of the demographics table and the linage table that share a common "patient ID" store data about the same individual patient. The relationships identified in section 226 define the "universe" of data about the model entity in the underlying physical database 214. Thus, starting from the relational table storing the identifier for a model entity, each relationship 226 flows outward in a hierarchy of data about each instance of the model entity available in the underlying database. Logical fields with access methods that map to columns in the tables specified in relationship section 226 may then be defined for the model entity, thereby providing the building blocks for an abstract query.

The Database Abstraction Model: Path Functions

In one embodiment, the database abstraction model 148 includes model entity path functions 227. Each path function 227 defines paths from a current model entity to related model entities. In this example, model entity path functions 227 include three path functions for the "patient" model entity: parents, children, and siblings, defined as follows:

Path Name: Parents
Function: select father from lineage where PID=? union select mother from lineage where PID=?
Path Name: children
Function: select PID from LINEAGE where father=? OR mother?
Path Name: Siblings
Function: select t2.PID from lineage t1 inner join lineage t2 on t1.father=t2.father or t1.mother=t2.mother where t1.PID=?

In this example, the path functions are implemented using an SQL select statement composed to retrieve the Patient ID for a related model entity from the underlying database 214. However, other mechanisms may be used. For example, instead of storing an SQL select statement, the path function defined for the "patient" model entity could itself be an abstract query, or could also be a remote procedure call, stored procedure, web services call, or other invokable procedure or method configured to identify relationships to the input model entity.

Figure 3:
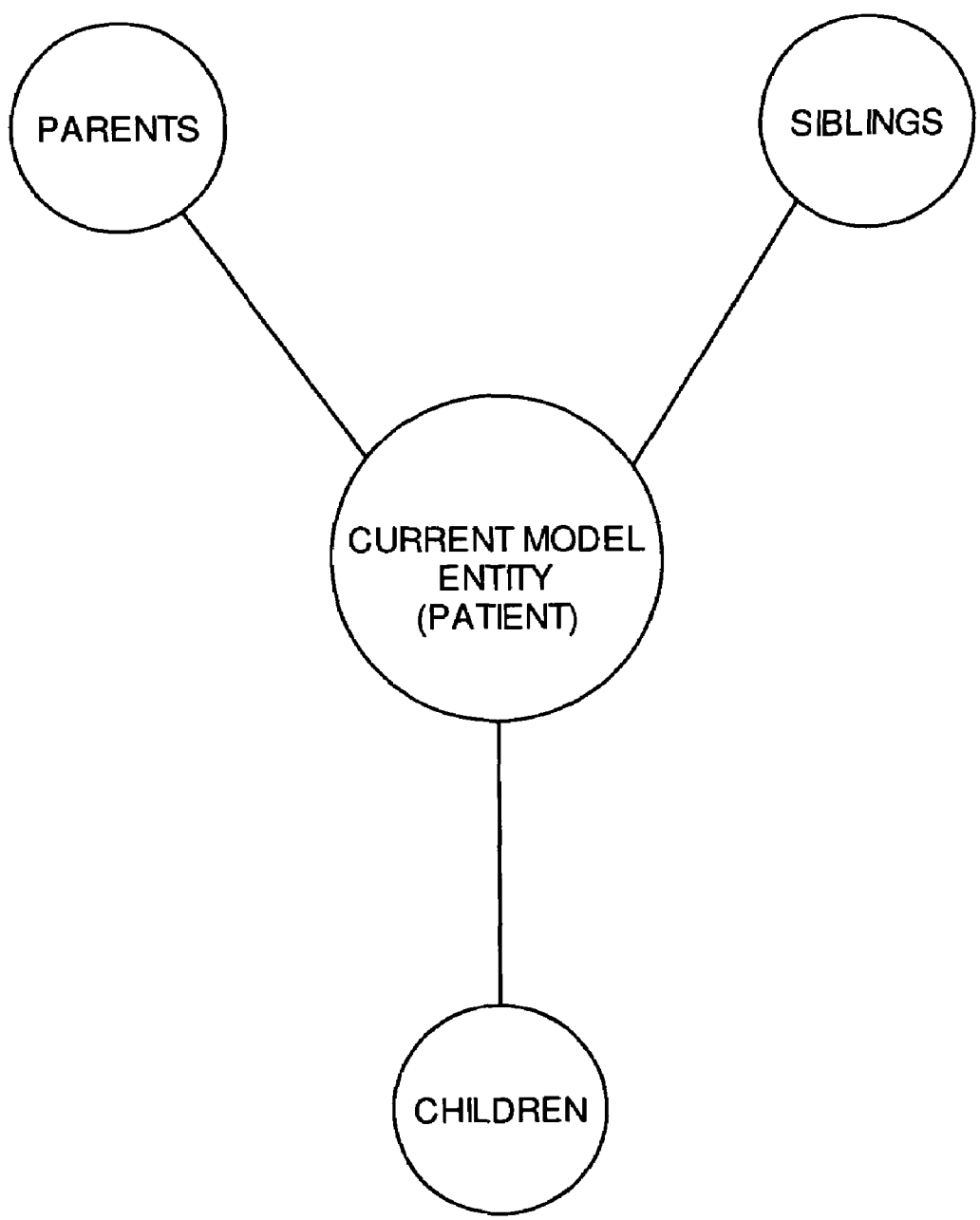
FIG. 3 illustrates a graphical representation of related paths among model entities, according to one embodiment of the invention.

FIG. 3 illustrates a graph representation 300 of these relationships and of the path from a current instance of the "patient" model entity to related instances. At the center of the graph is an instance of the patient model entity. Extending from the graph are paths to related model entities, including parents, children and siblings. Those skilled in the art will recognize that other paths, based on other degrees of consanguinity are possible. Moreover, related model entities (and model entity path functions) need not rely on consanguineous relationships. For example, a model entity path function 227 may identify individuals related by geographic location; such a path may be configured to identify patients residing in the same zip code, city, or state, etc., as the input model entity.

Returning to FIG. 2C, model entity definition 225 is illustrated with categories section 228. Depending on the relationships between model entities underlying the path function, section 225 indicates which logical fields may be included in a query condition against a related model entity. As illustrated, logical fields 208,6 are available to include in a query condition evaluated against related model entities, as all of the logical fields in this example would apply equally to related instances of the "Patient" model entity. For other logical fields or path functions, however, this may not occur. For example, a query condition applied against a "brother" path function (not illustrated) would not include a logical field for a pregnancy diagnosis. A "sister" or "mother" path function 227, however, would likely include such a logical field.

The Database Abstraction Model: Query Conditions on Related Model Entities

Embodiments of the invention allow a user to include conditions in an abstract query that are applied against any set of model entity instances "reachable" from the current model entity by using a path function 227. The following description uses the "patient" model entity purely as an example of query conditions on related model entities; however, any model entity defined or modeled for a particular database abstraction model 148 may be used.

Continuing with the example illustrated in FIGS. 2-3, FIG. 4 illustrates a set of relational database tables 400 corresponding to the database abstraction model illustrated in FIGS. 2A-2C. Database schema 400 includes the tables and columns referenced by the logical fields 208, access methods 210, model entities 225 and path functions 227 (collectively, the database abstraction model 248). Specifically, demographics table 440 stores the "PID" column 445 with the identifier used to distinguish between instances of the "patient" model entity. The "PID" column is related to a similar column in tables 410, 420 and 430. Accordingly data from these tables may be joined to form query results using the "PID" value. Lineage table 430 includes the data used by the path functions 227 to identify related model entities. Diagnosis table 420 and tests table 410 store data related to medical tests about some of the patients.

Those skilled in the art will recognize that the example database illustrated in FIG. 3 is simplified to illustrate embodiments of the present invention, and that a "production" database environment would likely include many more tables with additional columns, and more complex relationships between the tables.

Figure 5A:
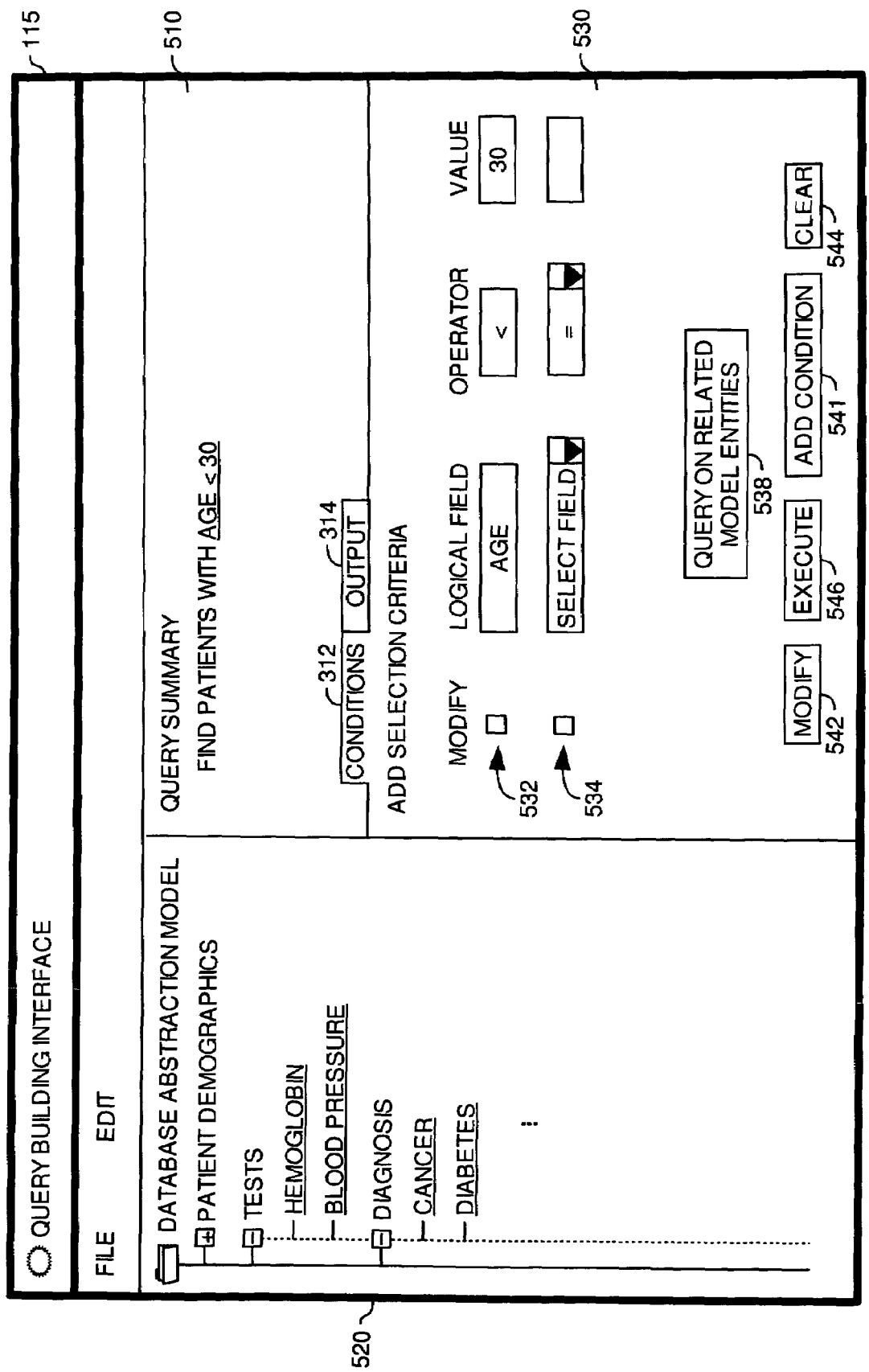

Illustratively, assume a user desires to research younger patients (under 30 in this example) who have a parent diagnosed with cancer. The researcher begins by composing an abstract query for the "patients" model entity and by placing conditions against patients (e.g., by specifying a selection criteria of "age>30"). FIG. 5A illustrates a graphical user interface screen 500 for composing an abstract query, according to one embodiment of the invention. Query summary section 510 is used to describe the query in prose form as it is being composed. Logical fields/model entity section 520 lists the model entities and logical fields available in the database abstraction model 148. In one embodiment, these may be displayed using an expandable hierarchy where similar logical fields are grouped into categories.

Query composition section 530 provides a display for adding selection criteria and results criteria to an abstract query. As illustrated, the abstract query being composed has a completed first condition 532 that specifies "age<30." Condition 534 is added to the query composition section 530 after the first one is completed. Condition 534 includes GUI constructs for adding a second condition to the growing abstract query. In addition to providing selection criteria 203, users may specify results criteria 204 using output tab 512.

After creating conditions for the abstract query, the interface 115 may be configured to allow a user to select a path from a current model entity to a related one, and further, to apply selection criteria on any related model entities. For example, button 538 labeled: "query on related model entities" may be used to specify a query conditions on related model entities. However, embodiments of the invention may be adapted to use many GUI constructs.

Figure 5B:
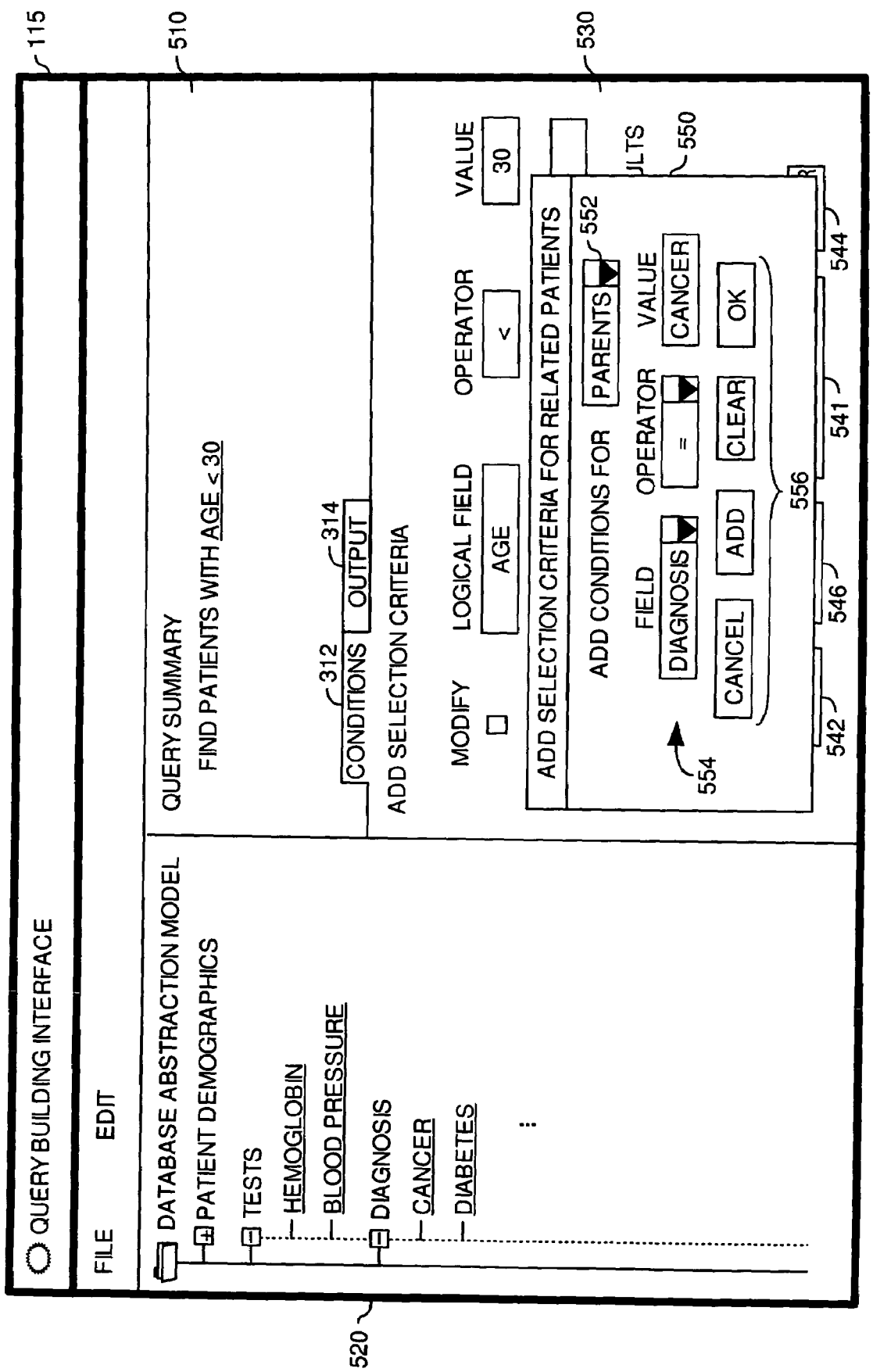

After selecting a path, the user may be presented with an abstract query conditions building screen where they can specify conditions evaluated against related instances of the model entity being queried. For example, FIG. 5B illustrates query building interface 115 and GUI screen 500 after a user has selected the "query on related model entities" button 538. In one embodiment, the query building interface may be configured to respond to this request by displaying dialog box 550. The dialog box includes a GUI control 552 for a user to select which path (i.e., which related model entities) the new condition should be applied against. As illustrated, a user has selected the "parents" path function 227 available for the "patient" model entity. The "parents" path function 227 is one of the three specified by the model entity definition 225 illustrated in FIG. 2C. Condition section 554 allows a user to add conditions like those applied for the abstract query in FIG. 5A. As illustrated, a user has selected to include a condition of "diagnosis='cancer'". After adding the desired conditions, a user may return to the primary query building interface screen 500 by selecting the "ok" button 556. Alternatively, a user may select to clear the current conditions, add additional conditions, or cancel the related model entity operation using one of GUI buttons 556.

In one embodiment, the process of applying conditions against related model entities may be iteratively repeated. For example, "parents" of a currently model entity, may themselves have related model entities upon which a condition may be applied. Thus, the query building interface 115 may allow a user to compose a query for two generations (i.e., both a parent and a grandparent) that satisfies the "diagnosis='cancer'" condition by adding this condition twice. In this way, a user may define conditions that are evaluated against instances of the model entity located adjacent to the current instance (represented by the central circle of FIG. 3) or any model entity instance reachable by traversing multiple paths. Thus, users may define conditions against the grandparents of the model entity instance even though no single-step path illustrated in FIG. 3 or path function 227 leads to "grandparents" of the current model entity.

FIG. 5C illustrates a graphical user interface screen 500 after a user has completed adding the query condition applied against related model entitles (e.g., after selecting the "OK" button on dialog box 550). Query summary section 510 is updated to reflect the related model entity condition of "parents with cancer diagnosis." In addition, query composition section 530 includes the related model entity query 540, allowing a user to edit (using button 542) or clear (using button 544) this condition, if desired. FIG. 5D illustrates an exemplary graphical user interface screen 570 for selecting logical fields to include in query output. In this example, query results section 580 lists that a user has selected to include the patient ID, first name, last name, and age of patients in the underlying database 214 that satisfy the conditions of the query, including the conditions evaluated against related model entities.

Figure 6:
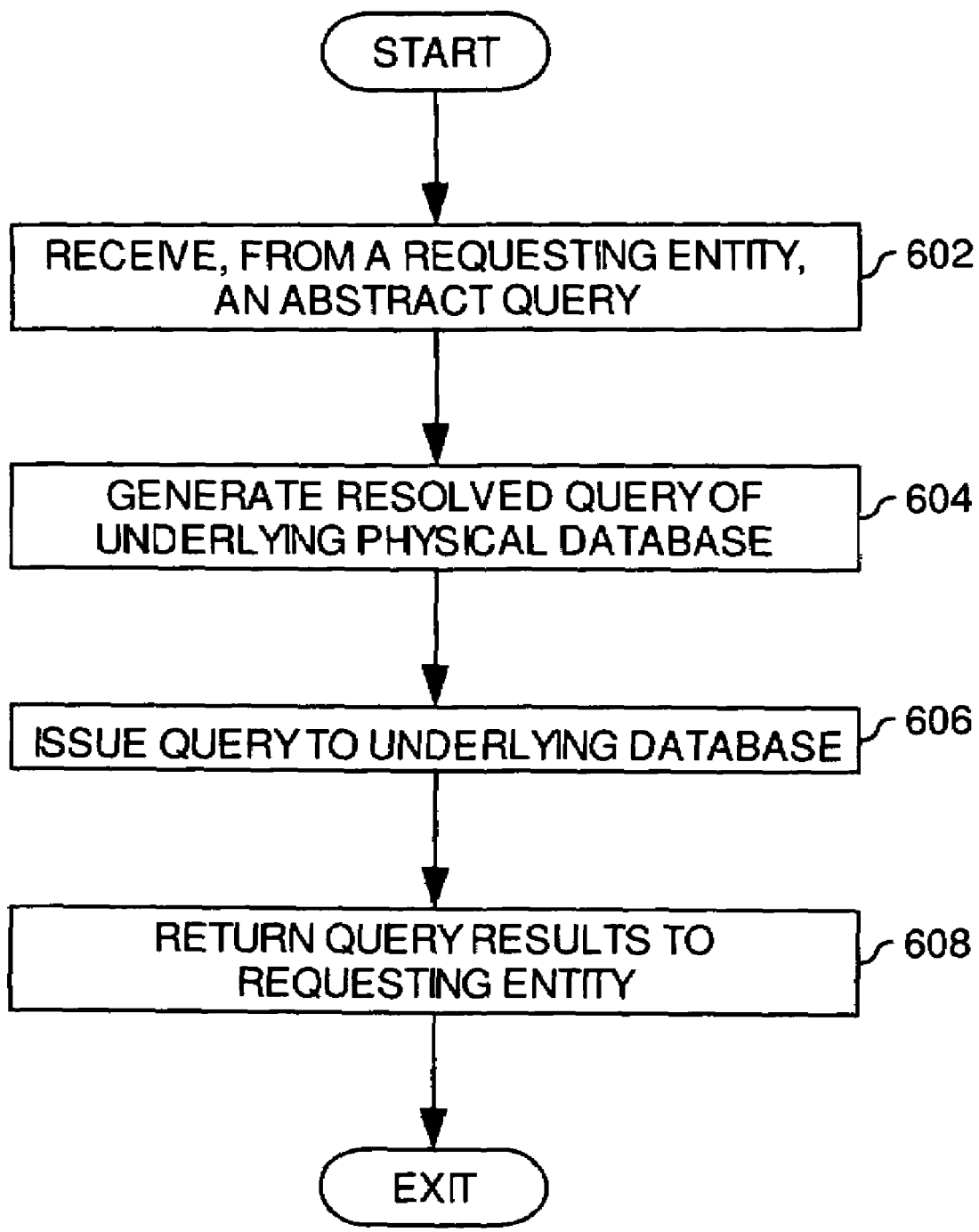
FIG. 6 illustrates a method for processing an abstract query, according to one embodiment of the invention.

Once a user has completed composing an abstract query, it may be submitted to the runtime component 114 for processing. FIG. 6 illustrates a method 600 for processing an abstract query and returning the query results, according to one embodiment of the invention. The method begins at step 602 after a user has composed an abstract query (e.g., using interface 115) and submitted the abstract query for processing. Once received, the runtime component 114 accesses the logical fields 208 included in the abstract query, along with the definitions for the logical fields 208, access methods 210, and the model entity 225 from the database abstraction model 148, and from this information, generates a resolved query of the underlying database (step 604). In one embodiment, the runtime component 114 receives the abstract query over network 104 using well-known data communication protocols, and the abstract query itself may be represented using a structured mark-up language (e.g., using the XML representation of abstract query illustrated in Table I). At step 606, after generating the resolved query, the runtime component 114 issues the resolved query to the underlying physical database 214. After processing the resolved query, query results are returned to the user at step 608.

Figure 5E:
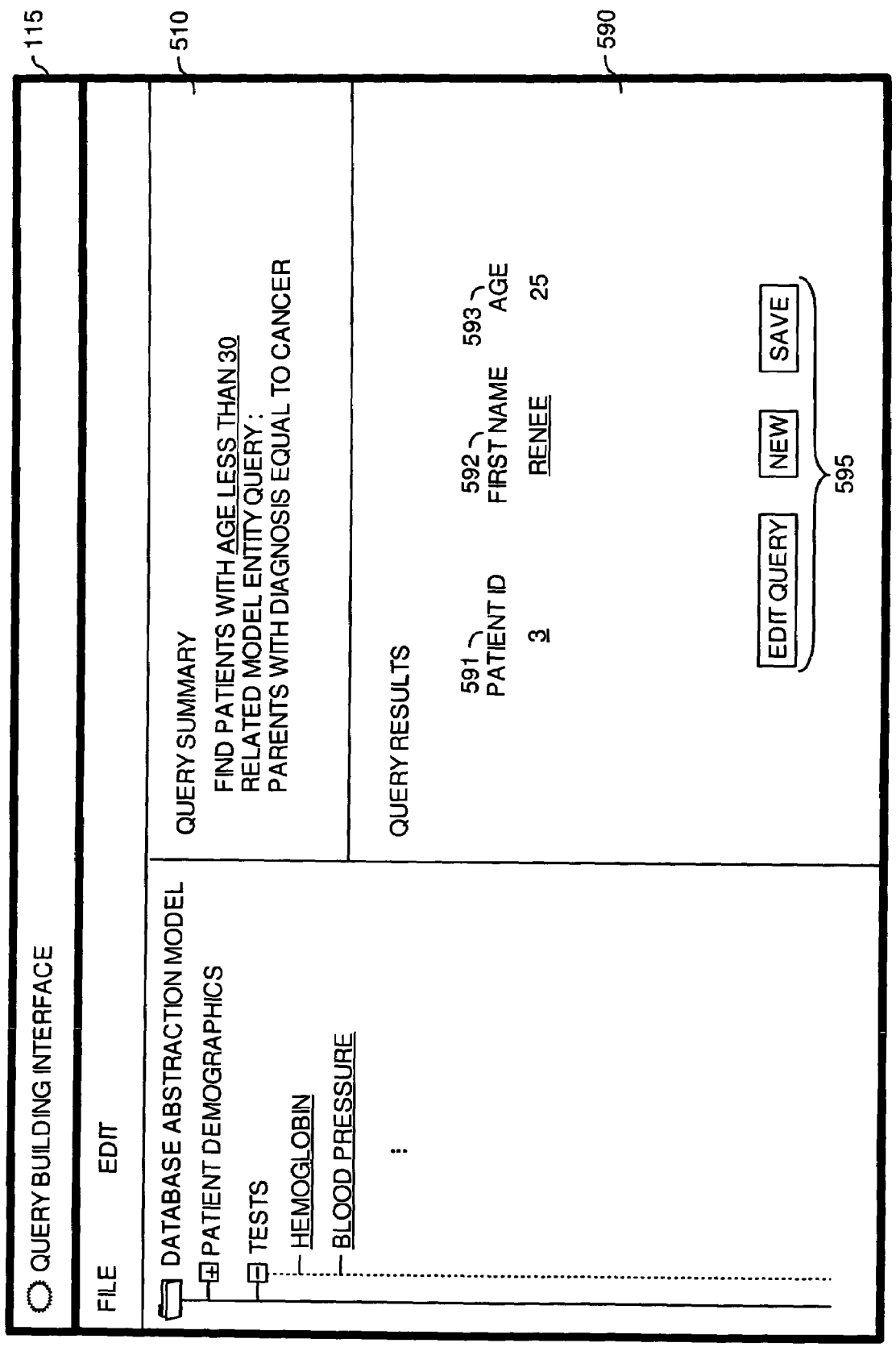

FIG. 5E illustrates an exemplary user interface screen 585 that displays a set of query results retrieved using the abstract query illustrated in FIGS. 5A-5D. That is, it illustrates data retrieved for the query: "find instances of the patient model entity less than 30 with a parent diagnosed with cancer." The screen 585 includes a query results display section 590 displaying a list of model entities that satisfy the conditions of abstract query 202. As illustrated the query results include the results criteria illustrated in FIG. 5D. Thus, display section 590 includes a display of each patient ID 365 (i.e., each instance of the "patient" model entity returned), data retrieved for the name logical field 592 and values for the age logical field 593. In this case, only the model entity represented by patient ID "3," "Renee," and "age 25," satisfied both the query of the patient model entity (find instances of the patient model entity less than 30) that also satisfied the query of the related model entity (with a parent diagnosed with cancer).

In addition, query results are illustrated using underlined values. This is included to represent an embodiment where query results are displayed using hyperlinks to additional data. In one embodiment, additional information about a model entity may be accessed using the hyperlink. Thus, for example, by clicking on the hyperlink for "Renee" the interface may request additional data available through the database abstraction model 148 about this instance of the "patient" model entity. In one embodiment, the request may be processed by identifying data about the "patient" model entity that is availably in the underlying database according to the model entity relationships 226 defined by the database abstraction model 148.

The foregoing exemplary graphical interface screens in FIGS. 5A-5E are included to illustrate embodiments of a query building interface 115 used to include conditions evaluated against related model entities. However, those skilled in the art will recognize that the actual graphical user interface elements included (e.g., buttons, checkboxes, drop-down lists, text boxes, etc.) are exemplary, and not limiting of the invention. Other graphical user interface elements may be used to provide an interface for composing an abstract query, including both currently-known and later developed graphical user interface elements.

Figure 7:
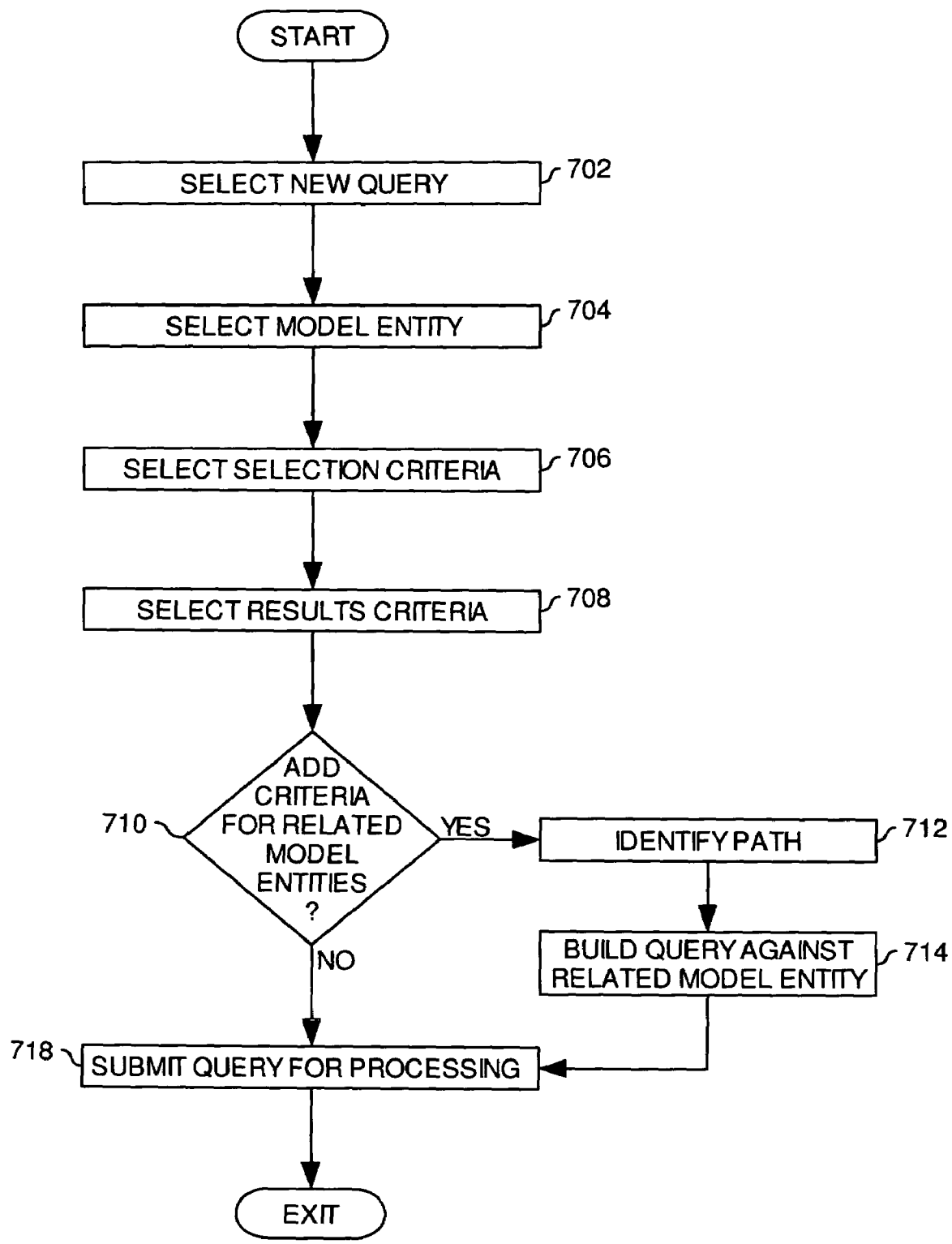
FIG. 7 illustrates a method for composing an abstract query that includes conditions evaluated against related model entities, according to one embodiment of the invention.

FIG. 7 illustrates a method for composing an abstract query that includes conditions applied against related model entities, according to one embodiment of the invention. The method 700 begins at step 702 wherein a user selects to compose an abstract query (e.g., using new query button 541). In one embodiment, a user first selects a model entity to query (step 704). Thereafter, a user specifies the selection criteria and results criteria for the query (steps 706 and 708). As part of this process, a user may optionally to add selection criteria applied against related model entities (step 708). If so, then a user first identifies a path from the current model entity being queried to the related model entities that a user desires to apply a condition against (step 712), e.g., a user may query using the paths to parents, children or siblings, as described above. Illustratively, a user may be presented with the graph representation of model entity paths, first illustrated in FIG. 3, allowing a user to click on the desired group of model entities identified using a path function to use in evaluating a query condition. Once the related model entity is selected, a user composes query conditions evaluated against the related model entity. That is, the user specifies selection criteria evaluated against instances of the related model entity identified using a path function 227 (step 714). Once completed, a user submits the query to runtime component 114 for processing (step 718).

CONCLUSION

The database abstraction model provides an intuitive interface for composing a complex query using graphical user interface constructs. Moreover, the database abstraction model may be enhanced to provide useful features not available from the underlying database, without having to modify the underlying database. One useful enhancement of the database abstraction model is the ability to apply query criteria against related instances of a model entity. To compose an abstract query, users select conditions and results criteria. Because model entities may have relationships among one another, embodiments of the invention allow for users to specify query criteria evaluated against related instances of the model entity. Related model entities may be identified by invoking a path function defined by the database abstraction model.

While the foregoing is directed to embodiments of the present invention, other and further embodiments of the invention may be devised without departing from the basic scope thereof, and the scope thereof is determined by the claims that follow.

What is claimed is:

1. A method for processing an abstract query, comprising:
   providing a database abstraction model that describes data stored in a physical database the database abstraction model comprising (i) a plurality of logical fields each specifying an access method for accessing data in the physical database, (ii) a model entity specifying an identifier in the physical database used to distinguish instances of the model entity, wherein a first instance of the model entity is related to a second instance of the model entity, according to a predefined relationship;
   receiving an abstract query composed using logical fields selected from the plurality of logical fields, wherein the abstract query specifies at least one condition to be evaluated using data associated with the first instance of the model entity to determine whether to include the second instance of the model entity in a query result returned for the abstract query;
   transforming the abstract query into a query consistent with a particular physical data representation of the physical database;
   issuing the transformed query to the underlying physical database; and
   returning, to the requesting entity, the set of query results received in response to issuing the transformed query.

2. The method of claim 1, wherein the model entity further specifies (i) a descriptive name indicating an entity type modeled by the model entity and (ii) data elements stored by the physical database that are associated with instances of the model entity.

3. The method of claim 2, wherein the identifier in the physical database comprises a primary key column of a relational table, and wherein values stored in the primary key column are used to distinguish instances of the model entity.

4. The method of claim 1, wherein the first instance of the model entity is identified using a path function configured to identify first instance of the model entity using the second instance as input to the path function.

5. The method of claim 1, wherein the model entity represents an individual, and wherein the predefined relationship between the first and second instances of the model entity comprises a consanguineous relationship.

6. The method of claim 1, wherein the model entity represents an individual, and wherein the predefined relationship between the first and second instances of the model entity comprises a geographic relationship.

* * * * *

UNITED STATES PATENT AND TRADEMARK OFFICE
CERTIFICATE OF CORRECTION

PATENT NO. : 7,580,949 B2
APPLICATION NO. : 11/106283
DATED : August 25, 2009
INVENTOR(S) : Dettinger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 836 days.

Signed and Sealed this

Fourteenth Day of September, 2010

David J. Kappos
*Director of the United States Patent and Trademark Office*